United States Patent
Mori et al.

(10) Patent No.: US 12,025,328 B2
(45) Date of Patent: Jul. 2, 2024

(54) OUTDOOR UNIT OF AIR-CONDITIONING APPARATUS

(71) Applicant: Mitsubishi Electric Corporation, Tokyo (JP)

(72) Inventors: Tomohiro Mori, Tokyo (JP); Motoshi Nasu, Tokyo (JP); Akinori Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 17/794,666

(22) PCT Filed: Mar. 19, 2020

(86) PCT No.: PCT/JP2020/012302
§ 371 (c)(1),
(2) Date: Jul. 22, 2022

(87) PCT Pub. No.: WO2021/186670
PCT Pub. Date: Sep. 23, 2021

(65) Prior Publication Data
US 2023/0100590 A1   Mar. 30, 2023

(51) Int. Cl.
*F24F 11/32*      (2018.01)
*F24F 1/20*       (2011.01)
(Continued)

(52) U.S. Cl.
CPC ............. *F24F 11/32* (2018.01); *F24F 1/20* (2013.01); *F24F 11/52* (2018.01); *F24F 11/86* (2018.01); *F24F 2140/00* (2018.01)

(58) Field of Classification Search
CPC .... F24F 1/20; F24F 11/32; F24F 11/52; F24F 11/86; F24F 11/88; F24F 11/89; F24F 2140/00; G01R 31/00
See application file for complete search history.

(56) References Cited

U.S. PATENT DOCUMENTS 5,720,342 A * 2/1998 Owens .................. E21B 36/003
                                                  166/57
5,730,217 A * 3/1998 Owens .................... F25B 21/02
                                                  166/57
(Continued)

FOREIGN PATENT DOCUMENTS

JP   H03-202787 A    9/1991
JP   H03-269269 A   11/1991
(Continued)

OTHER PUBLICATIONS

International Search Report of the International Searching Authority mailed Jun. 16, 2020 for the corresponding International Application No. PCT/JP2020/012302 (and English translation).

*Primary Examiner* — Nelson J Nieves
(74) *Attorney, Agent, or Firm* — Posz Law Group, PLC

(57) ABSTRACT

An outdoor unit of an air-conditioning apparatus includes: a refrigerant circuit in which a compressor and an outdoor-side heat exchanger are connected by a refrigerant pipe; an outdoor-side fan that sends air to the outdoor-side heat exchanger; and a controller including an inverter circuit configured to drive the compressor. The controller includes: a first heat generating component; a second heat generating component that generates a smaller amount of heat than the first heat generating component; a temperature detection circuit provided in the first heat generating component to detect a temperature thereof; a temperature acquisition module that acquires the temperature detected by the temperature detection circuit; and an estimate calculation module that calculates a temperature estimate of the second heat generating component based on the temperature acquired by the temperature acquisition module, and calculates an estimate of a life of the second heat generating component based on the temperature estimate.

8 Claims, 10 Drawing Sheets

(51) Int. Cl.
    *F24F 11/52*     (2018.01)
    *F24F 11/86*     (2018.01)
    *F24F 140/00*     (2018.01)

(56) References Cited

U.S. PATENT DOCUMENTS

| | | | | |
|---|---|---|---|---|
| 2008/0196863 | A1* | 8/2008 | Takechi | F25B 21/04 |
| | | | | 62/3.2 |
| 2016/0320077 | A1* | 11/2016 | Kim | B22D 17/00 |
| 2017/0118871 | A1* | 4/2017 | Choi | H05K 7/20354 |
| 2020/0300521 | A1* | 9/2020 | Yamamoto | H02P 29/026 |
| 2020/0358365 | A1* | 11/2020 | Yuasa | H02M 1/34 |
| 2021/0207894 | A1* | 7/2021 | Kurokawa | H01L 23/427 |
| 2021/0254841 | A1* | 8/2021 | Takayama | F25B 1/00 |
| 2021/0293419 | A1* | 9/2021 | Iwazaki | F24F 1/38 |
| 2021/0359634 | A1* | 11/2021 | Tsuchiya | H02M 7/5395 |
| 2022/0003434 | A1* | 1/2022 | Umehara | F24F 1/24 |
| 2022/0146130 | A1* | 5/2022 | Kwon | F24F 6/025 |
| 2022/0286060 | A1* | 9/2022 | Uemura | F24F 11/30 |
| 2022/0316748 | A1* | 10/2022 | Shizu | F24F 11/86 |

FOREIGN PATENT DOCUMENTS

| | | | | |
|---|---|---|---|---|
| JP | 2002-286306 | A | | 10/2002 |
| JP | 2008096018 | A | * | 4/2008 |
| JP | 2012-127650 | A | | 7/2012 |
| JP | 2014-211408 | A | | 11/2014 |
| JP | 2014-222113 | A | | 11/2014 |
| JP | 6529600 | B | | 6/2019 |

* cited by examiner

DRIVE FREQUENCY OF COMPRESSOR

ROTATION SPEED OF OUTDOOR-SIDE FAN

OUTDOOR UNIT OF AIR-CONDITIONING APPARATUS

CROSS-REFERENCE TO RELATED APPLICATION

This application is a U.S. National Stage Application of International Application No. PCT/JP2020/012302 filed on Mar. 19, 2020, the contents of which are incorporated herein by reference.

TECHNICAL FIELD

The present disclosure relates to an outdoor unit of an air-conditioning apparatus and particularly to an outdoor unit of an air-conditioning apparatus, which is provided with a controller including a heat generating component.

BACKGROUND

In an outdoor unit of an air-conditioning device, a controller that controls a compressor and a fan is provided. In the controller, a control board is provided. On the control board, a plurality of electrical components and electronic components are mounted. In the case where the compressor is an inverter compressor, the compressor is controlled by an inverter circuit mounted on the control board. The inverter circuit includes a power device such as an IGBT. The power device is a heat generating component that generates a large amount of heat.

For example, in an air-conditioning apparatus disclosed in Patent Literature 1, a control device includes an intelligent power module (IPM) that controls a compressor. The IPM includes a heat generating component. Thus, in the IPM, a thermistor and a temperature detection circuit are provided to detect a temperature of the IPM. A microcomputer controls an operating state of the compressor, depending on the detected temperature of the IPM.

Patent Literature

Patent Literature 1: Japanese Unexamined Patent Application Publication No. 2002-286306

In Patent Literature 1, the temperature of the IPM is detected by the thermistor, and a control is performed such that a rotational frequency of the compressor is reduced when a temperature of the heat generating component included in the IPM rises.

However, the controller also includes components other than the heat generating component. Even when the amounts of heat generated by these components are relatively small, the temperature of air in the controller is raised by heat from the heat generating component. At this time, the components other than the heat generating component may accumulate the heat. Lives of many of these components are shortened by the accumulation of heat. To estimate the lives of the components, the components needs to incorporate respective thermistors therein. However, the thermistor is expensive. Therefore, in the case where the components in the controller are made to incorporate respective thermistors, the manufacturing cost is increased. In view of this point, only some of the components incorporate respective thermistors as in Patent Literature 1. In this case, however, it is not possible to estimate lives of components including no thermistors. Consequently, those components each unexpectedly come to the end of the life thereof. Thus, the reliability of an outdoor unit of an air-conditioning apparatus is lowered.

SUMMARY

The present disclosure is applied to solve the above problem, and relates to an outdoor unit of an air-conditioning apparatus, which can keep the reliability thereof high, while reducing an increase in manufacturing cost, since on the basis of the temperature of a heating generating component, the lives of other components can be estimated.

An outdoor unit of an air-conditioning apparatus according to an embodiment of the present disclosure includes: a refrigerant circuit in which a compressor and an outdoor-side heat exchanger are connected by a refrigerant pipe; an outdoor-side fan configured to send air to the outdoor-side heat exchanger; and a controller including an inverter circuit configured to drive the compressor. The controller includes: a first heat generating component; a second heat generating component that generates a smaller amount of heat than the first heat generating component; a temperature detection circuit provided in the first heat generating component and configured to detect a temperature of the first heat generating component; a temperature acquisition module configured to acquire the temperature of the first heat generating component that is detected by the temperature detection circuit; and an estimate calculation module configured to calculate a temperature estimate of the second heat generating component based on the temperature acquired by the temperature acquisition module, and configured to calculate an estimate of a life of the second heat generating component based on the temperature estimate.

In the outdoor unit of the air-conditioning apparatus according to the embodiment of the present disclosure, the temperature detection circuit is provided in the first heat generating component, and the life of the second heat generating component is estimated based on the temperature of the first heat generating component. Because of the above configuration, it is possible to maintaining the reliability while reducing costs.

DETAILED DESCRIPTION

Embodiments of an outdoor unit of an air-conditioning apparatus according to the present disclosure will be described with reference to the drawings. The present disclosure is not limited to the embodiments described below and various modifications can be made thereto within the scope of the gist of the present disclosure. Furthermore, the present disclosure also covers, among configurations described in the embodiments below and modifications of the embodiments, various combinations of configurations that are combinable. Furthermore, in each of figures, components that are the same as or equivalent to those in a previous figure or previous figures are denoted by the same reference signs, and the same is true of the entire text of the specification. It should be noted that in each figure, the relative relationship in dimension between components or shapes thereof may differ from the actual ones.

Embodiment 1

Figure 1:
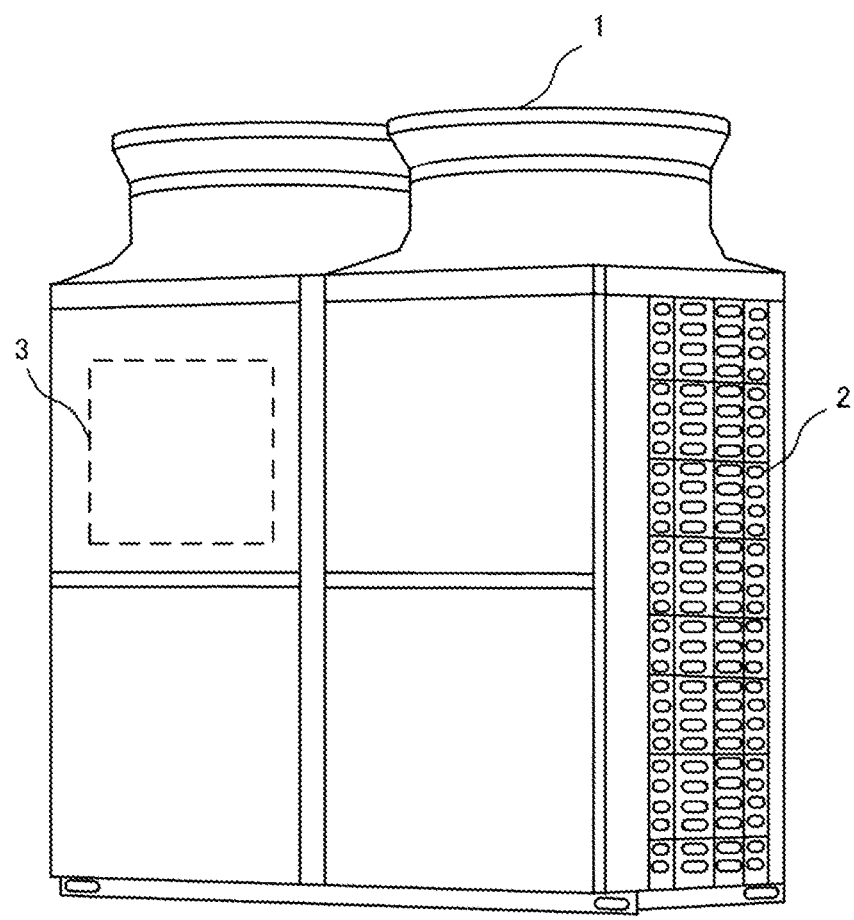
FIG. 1 is a perspective view illustrating an outdoor unit 1 of an air-conditioning apparatus 100 according to Embodiment 1.

FIG. 1 is a perspective view illustrating an outdoor unit 1 of an air-conditioning apparatus according to Embodiment 1. In FIG. 1, as a matter of convenience for explanation, part of a structure is indicated by a dashed line as a transparent view. As illustrated in FIG. 1, the outdoor unit 1 includes an outdoor-side heat exchanger 2 and a controller 3.

Figure 2:
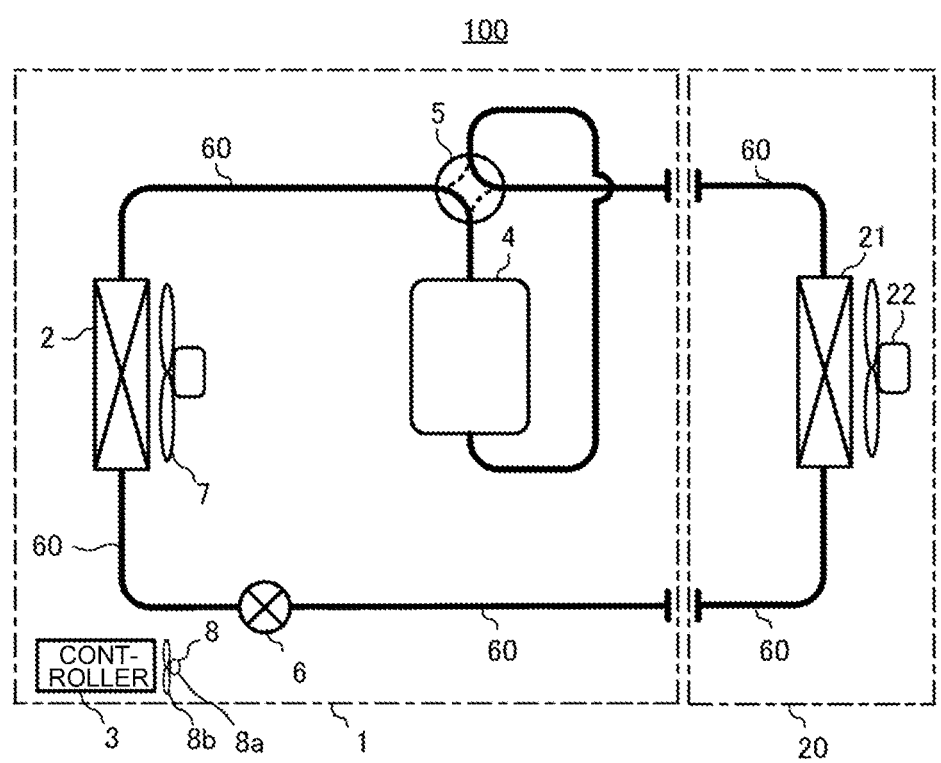
FIG. 2 is a refrigerant circuit diagram illustrating a configuration of the air-conditioning apparatus 100 according to Embodiment 1.

FIG. 2 is a refrigerant circuit diagram illustrating a configuration of an air-conditioning apparatus 100 according to Embodiment 1. As illustrated in FIG. 2, the air-conditioning apparatus 100 includes the outdoor unit 1 and an indoor unit 20.

The indoor unit 20 is installed in an indoor space. The air-conditioning apparatus 100 air-conditions the indoor space. On the other hand, the outdoor unit 1 is installed in an outdoor space. The outdoor unit 1 and the indoor unit 20 are connected by refrigerant pipes 60 as illustrated in FIG. 2.

As illustrated in FIG. 2, the indoor unit 20 includes an indoor-side heat exchanger 21, an indoor-side fan 22, and part of the refrigerant pipes 60. The indoor-side fan 22 sends indoor air to the indoor-side heat exchanger 21. The indoor-side heat exchanger 21 causes heat exchange to be performed between the indoor air and refrigerant that flows in the indoor-side heat exchanger 21. The indoor-side heat exchanger 21 is, for example, a fin-and-tube heat exchanger. The indoor-side heat exchanger 21 operates as a condenser when the air-conditioning apparatus 100 is in heating operation, and operates as an evaporator when the air-conditioning apparatus 100 is in cooling operation.

Figure 6:
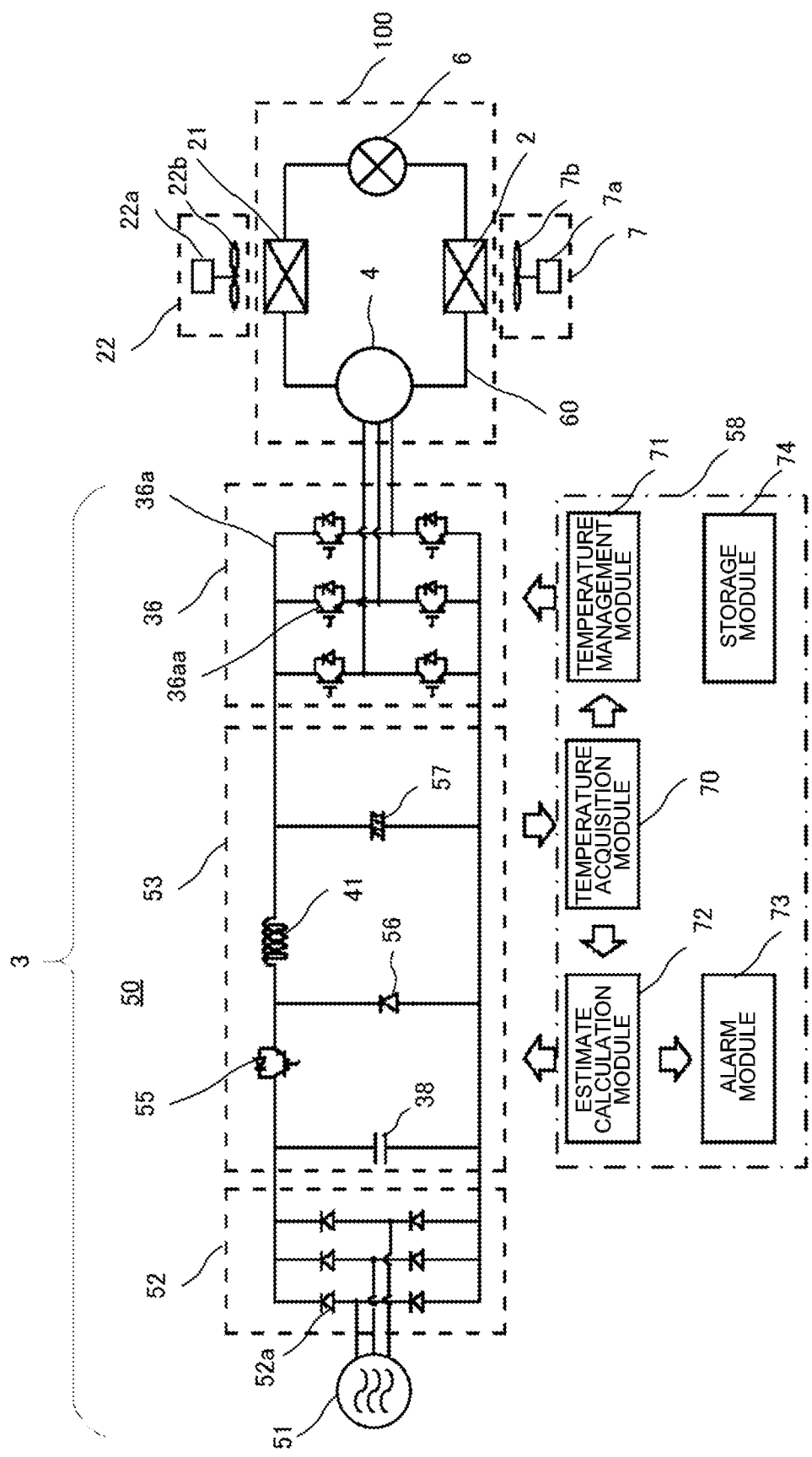
FIG. 6 is a schematic diagram illustrating a configuration of a power conversion device 50 provided in the air-conditioning apparatus 100 according to Embodiment 1.

The indoor-side fan 22 is, for example, a propeller fan. The indoor-side fan 22 includes a fan motor 22a and a fan 22b as illustrated in FIG. 6, which will be referred to later. The fan 22b is rotated by the fan motor 22a, which is a power source for the fan 22b.

Furthermore, as illustrated in FIG. 2, the outdoor unit 1 includes the outdoor-side heat exchanger 2, the controller 3, a compressor 4, a flow switching device 5, an expansion valve 6, an outdoor-side fan 7, a controller-side fan 8, and part of the refrigerant pipes 60. The outdoor unit 1 may further include another component or other components, such as an accumulator. In the outdoor unit 1, the compressor 4, the flow switching device 5, the expansion valve 6, the outdoor-side fan 7, and the controller-side fan 8 as illustrated in FIG. 2 are provided in addition to the controller 3 and the outdoor-side heat exchanger 2, though illustration of those components is omitted in FIG. 1.

The outdoor-side heat exchanger 2 causes heat exchange to be performed outdoor air and refrigerant that flows in the outdoor-side heat exchanger 2. The outdoor-side heat exchanger 2 is, for example, a fin-and-tube heat exchanger. The outdoor-side heat exchanger 2 operates as a condenser when the air-conditioning apparatus 100 is in cooling operation, and operates as an evaporator when the air-conditioning apparatus 100 is in heating operation.

The outdoor-side fan 7 sends outdoor air to the outdoor-side heat exchanger 2. The outdoor-side fan 7 includes a fan motor 7a and a fan 7b as illustrated in FIG. 6. The fan 7b is rotated by the fan motor 7a, which is a power source for the fan 7b. The outdoor-side fan 7 is, for example, a propeller fan. The rotation speed of the outdoor-side fan 7 is controlled by the controller 3.

Figure 3:
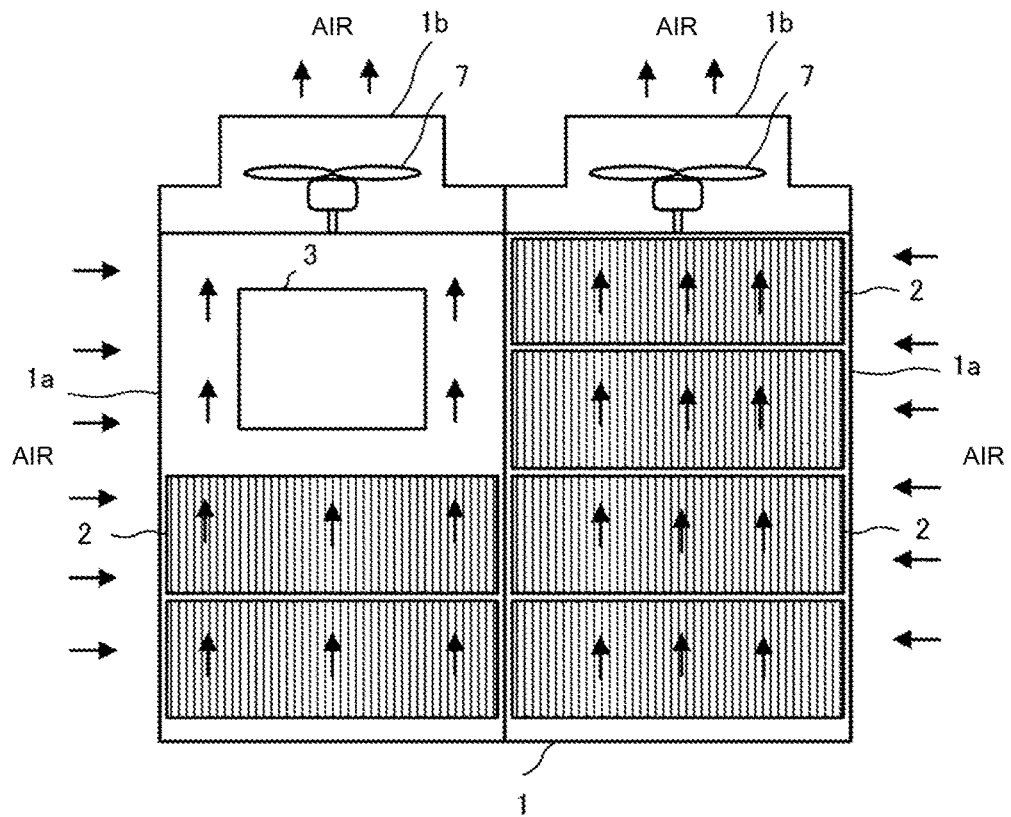
FIG. 3 is a front view schematically illustrating the flow of air in the outdoor unit 1 of the air-conditioning apparatus 100 according to Embodiment 1.

FIG. 3 is a front view schematically illustrating the flow of air in the outdoor unit 1 of the air-conditioning apparatus 100 according to Embodiment 1. In FIG. 3, arrows indicate the flows of air. As illustrated in FIG. 3, the outdoor unit 1 includes two outdoor-side fans 7. The two outdoor-side fans 7 are disposed in an upper portion of the outdoor unit 1. In the outdoor unit 1, outdoor air is sucked from inlet ports 1a provided in side surfaces of the outdoor unit 1 by driving the outdoor-side fans 7 as illustrated in FIG. 3. The outdoor air passes through each of the outdoor-side heat exchangers 2. At this time, heat exchange is performed between the outdoor air and refrigerant that flows in the outdoor-side heat exchanger 2. Subsequently, the air is blown out from outlet ports 1b provided in the upper portion of the outdoor unit 1 to the outside. Thus, in the outdoor unit 1, air passages are provided between the inlet ports 1a and the outlet ports 1b. Therefore, in the outdoor unit 1, air flows upwards from a lower region therein. Thus, a lower portion of the outdoor unit 1 is located on a windward side in the flow of air, and the upper portion of the outdoor unit 1 is located on a leeward side in the flow of air. Furthermore, the controller 3 is provided in the air passages and cooled by air that flows therein.

FIG. 2 will be re-referred to. The compressor 4 sucks low-pressure gas refrigerant, compresses the low-pressure gas refrigerant to change it into high-pressure gas refrigerant, and discharges the high-pressure gas refrigerant. The compressor 4 is, for example, an inverter compressor. The inverter compressor is controlled by an inverter circuit or other similar circuits such that the amount of refrigerant that is sent per module time can be changed. The inverter circuit is included, for example, in the controller 3.

The flow switching device 5 is a valve that switches the flow direction of refrigerant in the refrigerant pipe 60 between a plurality of flow directions. The flow switching device 5 is, for example, a four-way valve. The flow switching device 5 is controlled by the controller 3 to switch the flow direction of the refrigerant between a flow direction of the refrigerant in the case where the air-conditioning apparatus 100 is in cooling operation and a flow direction of the refrigerant in the case where the air-conditioning apparatus 100 is in heating operation. To be more specific, when the air-conditioning apparatus 100 is in cooling operation, the flow switching device 5 is made to be in a state indicated by solid lines in FIG. 2, whereby refrigerant discharged from the compressor 4 flows into the outdoor-side heat exchanger 2. When the air-conditioning apparatus 100 is in heating operation, the flow switching device 5 is made to be in a state indicated by dashed lines in FIG. 2, whereby the refrigerant discharged from the compressor 4 flows into the indoor-side heat exchanger 21 of the indoor unit 20.

In order that refrigerant liquefied in a condenser be easily evaporated in an evaporator, the expansion valve 6 reduces the pressure of liquid refrigerant that flows into the expansion valve 6, by expanding the liquid refrigerant, and then causes the refrigerant to flow out. Furthermore, the expansion valve 6 adjusts the amount of the refrigerant such that the amount of the refrigerant is kept at an appropriate value that varies depending on a load on the evaporator. The expansion valve 6 is, for example, an electronic expansion valve. The opening degree of the expansion valve 6 is controlled by the controller 3. The expansion valve 6 is connected between the outdoor-side heat exchanger 2 and the indoor-side heat exchanger 21 and by refrigerant pipes 60 as illustrated in FIG. 2.

The refrigerant pipes 60 connects the compressor 4, the flow switching device 5, the outdoor-side heat exchanger 2, the expansion valve 6, and the indoor-side heat exchanger 21 as illustrated in FIG. 2, whereby a refrigerant circuit is provided.

The controller-side fan 8 sends air to the controller 3 to cool the controller 3. The controller-side fan 8 includes a fan motor 8a and a fan 8b. The fan 8b is rotated by the fan motor 8a, which is a power source for the fan 8b. The controller-side fan 8 is, for example, a propeller fan. The controller-side fan 8 is controlled by the controller 3 to be turned on or off. The rotation speed of the controller-side fan 8 may be constant, and thus, a driving inverter circuit therefor is not particularly necessary. It is not indispensable that the controller-side fan 8 is provided; that is, the controller-side fan 8 may be provided as necessary.

Figure 4:
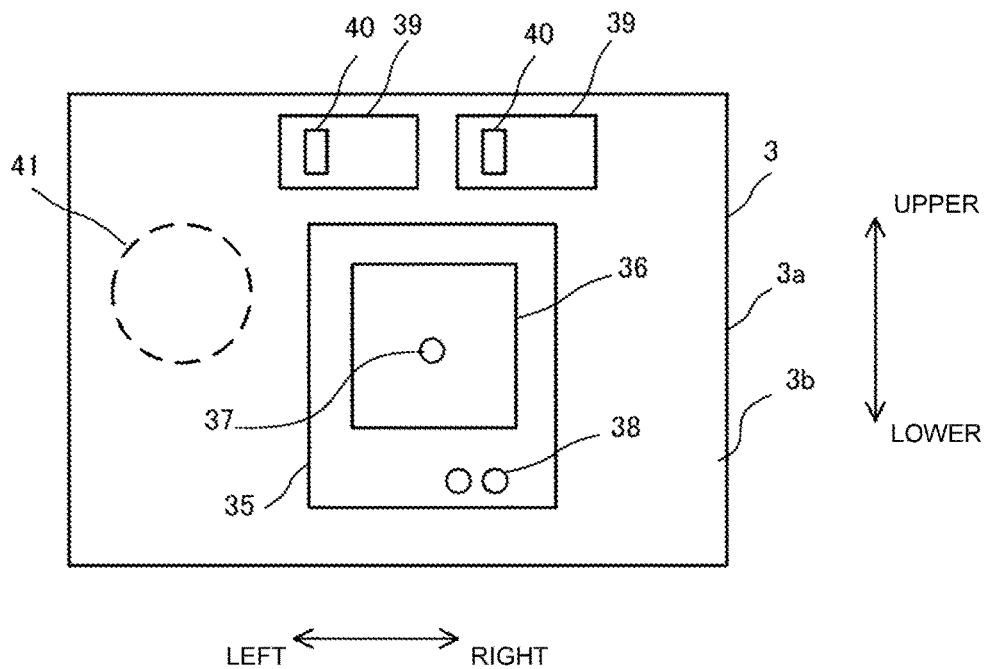
FIG. 4 is a front view illustrating a configuration of a controller 3 provided in the air-conditioning apparatus 100 according to Embodiment 1.
Figure 5:
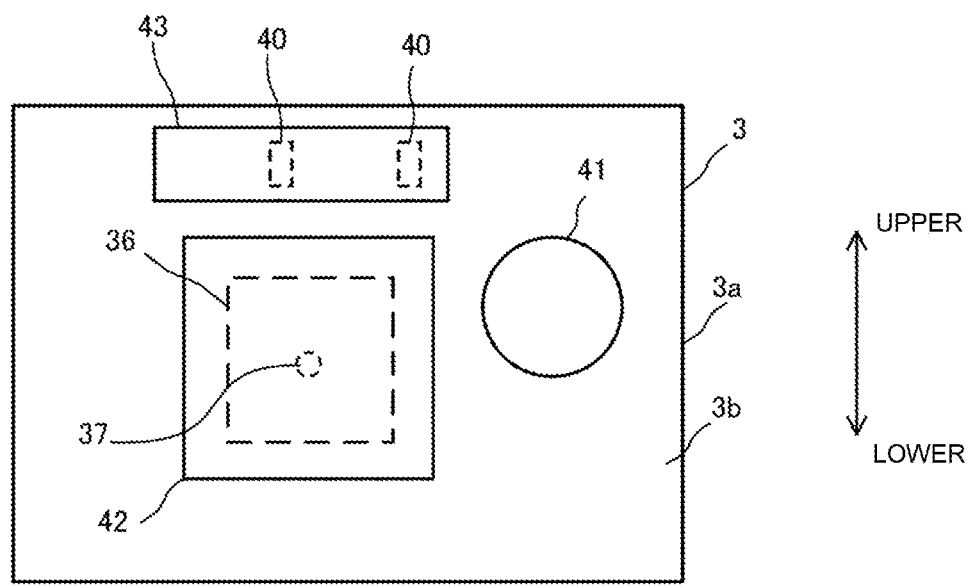
FIG. 5 is a rear view illustrating the configuration of the controller 3 provided in the air-conditioning apparatus 100 according to Embodiment 1.

FIG. 4 is a front view illustrating a configuration of the controller 3 provided in the air-conditioning apparatus 100 according to Embodiment 1. FIG. 5 is a rear view illustrating the configuration of the controller 3 provided in the air-conditioning apparatus 100 according to Embodiment 1. In FIGS. 4 and 5, as a matter of convenience for explanation, part of the configuration is indicated by a dashed line as a transparent view.

As illustrated in FIGS. 4 and 5, the controller 3 includes a housing 3a. In the housing 3a, as illustrated in FIGS. 4 and 5, a main board 3b is provided. On a front side of the main board 3b, a first inverter board 35 and two second inverter boards 39 are provided as illustrated in FIG. 4. Furthermore, on a rear side of the main board 3b, a first heat sink 42, a second heat sink 43, and a reactor 41 are provided as illustrated in FIG. 5.

As illustrated in FIG. 4, the first inverter board 35 is provided at a central portion of the main board 3b. The first inverter board 35 is formed in the shape of a rectangular or a substantially rectangular plate. The center of the first inverter board 35 is located at a middle position of the controller 3 in an up-down direction thereof or at a position that is offset downward from the middle position in the up-down direction. Furthermore, the center of the first inverter board 35 is located at a middle position of the controller 3 in a lateral direction thereof or at a position that is offset rightward from the middle position in the lateral direction. Each of the two second inverter boards 39 is formed in the shape of a rectangular or a substantially rectangular plate. Furthermore, the second inverter boards 39 are each located above the first inverter board 35. The distances between the first inverter board 35 and the second inverter boards 39 are smaller than a certain fixed value, and are shorter than, for example, short sides of the second inverter boards 39 or smaller than an outer diameter of each of main electrolytic capacitors 38. Furthermore, the reactor 41 is provided leftward relative to the first inverter board 35 and second inverter boards 39. The distance between the reactor 41 and the first inverter board 35 is smaller than a certain fixed value, and is shorter than, for example, the short sides of the respective second inverter boards 39. This layout is not indispensable, but it is preferable that the first inverter board 35, the second inverter boards 39, and the reactor 41 be provided relatively close to each other in the above manner.

On the first inverter board 35, a first IPM 36 that drives the compressor 4, and main electrolytic capacitors 38 are mounted. The first IPM 36, the main electrolytic capacitors 38, and the reactor 41 form a power conversion device 50 that is configured as FIG. 6 to drive the compressor 4. The power conversion device 50 will be described later. Furthermore, a temperature detection circuit 37 is provided in the first IPM 36. The temperature detection circuit 37 detects a temperature of the first IPM 36 at all times. The temperature detection circuit 37 is, for example, a thermistor. At the first inverter board 35, the first IPM 36 is located above the main electrolytic capacitors 38. Thus, the main electrolytic capacitors 38 are located windward of the first IPM 36.

On the rear side of the main board 3b, the first heat sink 42 is provided as illustrated in FIG. 5. The first heat sink 42, as illustrated in FIG. 5, is located in such a manner as to conform to a region where the first IPM 36 is provided. That is, the first heat sink 42 is not provided in a region where the main electrolytic capacitors 38 are provided. The first heat sink 42 dissipates heat generated from the first IPM 36 to cool the first IPM 36. Furthermore, the main electrolytic capacitors 38 generate a smaller amount of heat than the first IPM 36. Thus, since the main electrolytic capacitors 38 are provided windward of the first IPM 36, the main electrolytic capacitors 38 are sufficiently cooled even if no heat sink is provided.

As illustrated in FIG. 4, second IPMs 40 that drive the respective outdoor-side fans 7 are mounted on the respective second inverter boards 39. As the first IPM 36, the second IPMs 40 are supplied with power and current that are low in value, are thus components that generate a small amount of heat. Furthermore, the second IPMs 40 have a large temperature margin, and it is therefore unnecessary to detect temperatures of the second IPMs 40 at all times. Thus, no temperature detection circuit is provided in the second IPMs 40.

On the rear side of the main board 3b, the second heat sink 43 is provided as illustrated in FIG. 5. The second heat sink 43, as illustrated in FIG. 5, is provided based on a region where each of the second IPMs 40 is provided. The second heat sink 43 dissipates heat generated from the second IPMs 40 to cool the second IPMs 40. As described above, the amount of heat generated from the second IPMs 40 is small. As described with reference to FIG. 3, air sucked into the outdoor unit 1 flows upward from the lower region in the outdoor unit 1. Therefore, the second heat sink 43 is provided leeward of the first heat sink 42. As a result, the second heat sink 43 is supplied with air heated by heat dissipated from the first heat sink 42. Thus, since the first IPM 36 differs from the second IPMs 40 in the amount of heat generation, it is preferable that the position of each of the components be determined based on the amount of heat generation. Specifically, it is preferable that a component that generates a large amount of heat be provided on the windward side and a component that generates a small amount of heat is provided on the leeward side. Furthermore, since individual components generate different amounts of heat as described above, based on this, the position of each component is determined, whereby the individual components can be sequentially disposed along the air passage. Because of this configuration, cooling of each component is facilitated. Furthermore, a component or components that need to be provided on the windward side are limited, and other components can be provided in any area other than the windward side. It is therefore possible to more flexibly determine the position of each component.

In such a manner, in Embodiment 1, the first heat sink 42 is provided for the first IPM 36, and the second heat sink 43 is provided for the second IPMs 40, whereby the outdoor unit 1 ensures heat dissipation. Both the first heat sink 42 and the second heat sink 43 are disposed in the air passage for an outdoor-side fan 7. Thus, the first heat sink 42 and the second heat sink 43 cool the first IPM 36 and the second IPMs 40 using wind raised by driving the outdoor-side fan 7.

It is illustrated by way of example in FIG. 5 that a single second heat sink 43 is provided for the two second inverter boards 39, but it is not limiting. The single second heat sink 43 may be provided for a single second inverter board 39. Furthermore, it is illustrated by way of example in FIG. 4 that the number of the main electrolytic capacitors 38 is two, but it is not limiting. An arbitrary number of main electrolytic capacitors 38 may be provided.

Next, the power conversion device 50 included in the controller 3 will be described. FIG. 6 is a schematic diagram illustrating a configuration of the power conversion device 50 provided in the air-conditioning apparatus 100 according to Embodiment 1. It is illustrated by way of example in FIG. 6 how the power conversion device 50 is configured, but it is not limiting. It should be noted that FIG. 6 illustrates the power conversion device 50 that drives the compressor 4. A configuration of a power conversion device that drives the outdoor-side fan 7 may be basically the same as that in FIG. 6, and its description will thus be omitted.

As illustrated in FIG. 6, the power conversion device 50 controls the operation of the compressor 4, using alternating-current power supplied from a three-phase alternating-current power supply 51. The power conversion device 50 is configured to control a driving frequency of the compressor 4. That is, the power conversion device 50 converts alternating-current power supplied from the three-phase alternating-current power supply 51 into direct-current power, generates power for driving the compressor 4, and supplies the power to the compressor 4.

The power conversion device 50 includes a three-phase rectifier 52, a step-down circuit 53, and the first IPM 36. The first IPM 36 includes an inverter circuit 36a. The three-phase rectifier 52 rectifies an alternating-current voltage of the three-phase alternating-current power supply 51, and converts the alternating-current voltage into a direct-current voltage. In an example as illustrated in FIG. 6, the three-phase rectifier 52 is a three-phase full-wave rectifier in which six rectifier diode elements 52a are bridge-connected.

The step-down circuit 53 is a circuit that reduces a direct-current voltage supplied from the three-phase rectifier 52 to any direct-current voltage. The step-down circuit 53 is subjected to feedback control such that a direct-current bus voltage reaches a target voltage value. The step-down circuit 53 includes a main electrolytic capacitor 38, a step-down switching element 55, the reactor 41, a backflow prevention element 56, and a smoothing capacitor 57. The step-down switching element 55 are made to be in either the on-state or the off-state, and the time period in which the step-down switching element 55 is in the on-state and that in which the step-down switching element 55 is in the off-state are set based on a voltage value to be reduced. The reactor 41 supplies power to a load side. The backflow prevention element 56 is provided to continuously cause current to flow.

The main electrolytic capacitor 38 is connected to an output section of the three-phase rectifier 52 and reduces ripple current generated during a switching operation of the step-down switching element 55. Furthermore, the main electrolytic capacitor 38 acts in such a manner as to reduce a surge voltage generated when the step-down switching element 55 is turned off. Because of the action of the main electrolytic capacitor 38, an excessive serge voltage is not applied to a device, even when the step-down switching element 55 is turned off while electric current is flowing. Thus, the power conversion device 50 can continue to operate normally. It should be noted that an impedance of a power supply is included in the three-phase alternating-current power supply 51, and a surge voltage may be generated by an inductance component of the impedance of the power supply. The smoothing capacitor 57 smooths a pulsed voltage subjected to switching by the step-down switching element 55 and the backflow prevention element 56. That is, the smoothing capacitor 57 is provided to smooth a direct-current voltage.

The step-down switching element 55 is a semiconductor device, such as a silicon (Si) device. More specifically, the step-down switching element 55 is a metal-oxide-semiconductor field-effect transistor (MOSFET) or insulated gate bipolar transistor (IGBT), which is a semiconductor device.

The backflow prevention element 56 is a semiconductor device, such as a silicon device. The backflow prevention element 56 may be a semiconductor device, such as a fast recovery diode. Furthermore, in the case where switching is simply performed not at a high frequency but at a frequency that is approximately several times higher than a power-supply frequency, the backflow prevention element 56 may be an inexpensive contact component. As the inexpensive contact component, it is possible to adopt, for example, a relay that performs switching partially for a power supply period.

The inverter circuit 36a converts direct-current power smoothed by the smoothing capacitor 57 into three-phase alternating-current power. The inverter circuit 36a includes a plurality of switching elements 36aa that are semiconductor devices, such as IGBTs. In the example as illustrated in FIG. 6, in the inverter circuit 36a, six switching elements 36aa are bridge-connected. That is, the inverter circuit 36a converts a direct-current bus voltage into three-phase alternating-current voltages because of actions of the six switching elements 36aa, and supplies alternating currents to the compressor 4.

Furthermore, as illustrated in FIG. 6, the controller 3 includes a control module 58. The control module 58 includes a temperature acquisition module 70, a temperature management module 71, an estimate calculation module 72, an alarm module 73, and a storage module 74.

The temperature acquisition module 70 acquires a temperature of the first IPM 36 that is detected by the temperature detection circuit 37 as illustrated in FIGS. 4 and 5.

The temperature management module 71 manages a temperature of a first heat generating component on the basis of the temperature acquired by the temperature acquisition module 70. The first heat generating component is a component that generates a large amount of heat. There is a possibility that the temperature of the first heat generating component will exceed an abnormal temperature and the first heat generating component will be thus broken. Whether such a problem will occur or not depends on operation conditions. In Embodiment 1, for example, the first IPM 36 and the reactor 41 are first heat generating components. The temperature management module 71 uses a temperature of the first IPM 36 as a temperature of the first heat generating component. When the temperature of the first heat generating component reaches a first threshold value or higher that is determined in advance, the temperature management module 71 performs a first process to reduce the temperature of the first heat generating component. The first process is a high-temperature protection process for protecting the first heat generating component from a high temperature. As the first process, for example, the following processes (a1) to (d1) are provided. It should be noted that in FIGS. 9 and 10 to be described later, the first threshold value is a value indicated by a dotted line 94 and is lower than an abnormal temperature indicated by a dotted line 90. Since the first heat generating component may be broken when the temperature thereof reaches the abnormal temperature, the first process is performed at a point in time when the temperature of the first heat generating component reaches the first threshold value or higher, which is lower than the abnormal temperature.

(a1): A process of increasing a rotation speed of the outdoor-side fan 7. When the rotation speed of the outdoor-side fan 7 is increased, the efficiency of cooling the first heat generating component is increased.

(b1): A process of decreasing a driving frequency of the compressor 4. When the driving frequency of the compressor 4 is decreased, power that is supplied to the power conversion device 50 is decreased, thereby reducing a rise in the temperature of the first heat generating component.

(c1): A process of starting to drive the controller-side fan 8 provided for the controller 3. When the controller-side fan 8 is driven, air is sent to the controller 3, thereby cooling the controller 3.

(d1): A process of stopping the operation of the outdoor unit 1.

In Embodiment 1, as described above, the temperature of the first IPM 36 is used as the temperature of the first heat generating component. That is, the temperature detection circuit 37 is provided in the first IPM 36. On the other hand, no temperature detection circuit is provided in the reactor 41 for the following reason. Both the first IPM 36 and the reactor 41 are disposed in the housing 3a of the controller 3. Thus, the first IPM 36 and the reactor 41 are used under the same environment. Temperatures of the first IPM 36 and the reactor 41 change depending on the driving frequency of the compressor 4 such that the tendencies of their changes are similar to each other. For this reason, the temperature detection circuit 37 is provided only in a component for which the most stringent temperature condition is set, of first heat generating components, and detects a temperature, whereby it is not particularly necessary to detect temperatures of other components. Therefore, in Embodiment 1, the temperature detection circuit 37 is provided only in the first IPM 36. As the temperature detection circuit 37, an expensive thermistor is used. In Embodiment 1, the number of temperature detection circuits can be greatly reduced, as compared with the case where temperature detection circuits are provided in respective components. Thus, the cost of the outdoor unit 1 can be reduced.

FIG. 6 will be re-described. The estimate calculation module 72 calculates an estimate of a temperature of a second heat generating component based on the temperature of the first heat generating component. Hereinafter, an estimate of the temperature of the second heat generating component will be referred to as a temperature estimate of the second heat generating component. The second heat generating component is a component that generates a smaller amount of heat than the first heat generating component. The second heat generating component has a characteristic in which a life thereof is shortened by accumulation of heat. In Embodiment 1, the second heat generating component is, for example, the main electrolytic capacitor 38.

It should be noted that a temperature estimate T2 of the second heat generating component is obtained, for example, by the following equation (1), where T1 is the temperature of the first heat generating component; and a coefficient α and a coefficient β are determined in advance for each of components and registered in the storage module 74. Furthermore, it is preferable that the coefficient α and the coefficient β be changed depending on the rotation speed of the outdoor-side fan 7, and the coefficient α and the coefficient β are thus determined in advance for each component and for each of values of the rotation speed of the outdoor-side fan 7. The coefficient α is a positive value smaller than 1 (0<α<1). The coefficient β is a positive value or negative value.

$$T2 = \alpha \times T1 + \beta \tag{1}$$

Figure 9:
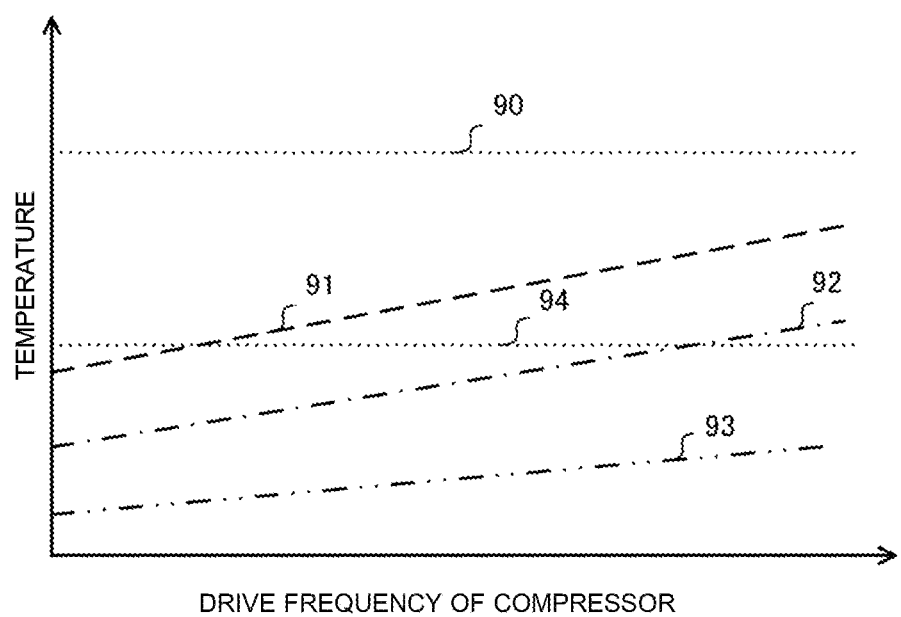
FIG. 9 is a graph indicating a relationship between a temperature of each of components and a driving frequency of a compressor 4 in the outdoor unit 1 of the air-conditioning apparatus 100 according to Embodiment 1.

A method of determining the coefficient α and the coefficient β will be described with reference to FIG. 9. FIG. 9 is a graph indicating a relationship between a temperature of each component and a driving frequency of the compressor 4 in the outdoor unit 1 of the air-conditioning apparatus 100 according to Embodiment 1. In FIG. 9, the horizontal axis represents the driving frequency of the compressor 4, and the vertical axis represents temperatures of the reactor 41, the first IPM 36, and the main electrolytic capacitor 38. In FIG. 9, the dotted line 90 represents the abnormal temperature. The first heat generating component is broken when the temperature thereof exceeds the abnormal temperature 90. A dashed line 91 represents a temperature of the reactor 41. A dashed-dotted line 92 represents a temperature of the first IPM 36 that is detected by the temperature detection circuit 37. A dashed-two dotted line 93 represents a temperature of the main electrolytic capacitor 38. The dotted line 94 represents the first threshold value. Thus, in Embodiment 1, with respect to the first heat generating component and the second heat generating component, data regarding a relationship between a change in the temperature of each component and the driving frequency of the compressor 4 is acquired in advance, for example, through an experiment. At a stage in which the data is acquired, at each component, a temperature detection circuit is provided. Then, the coefficient α and the coefficient β are determined based on the obtained data.

Figure 10:
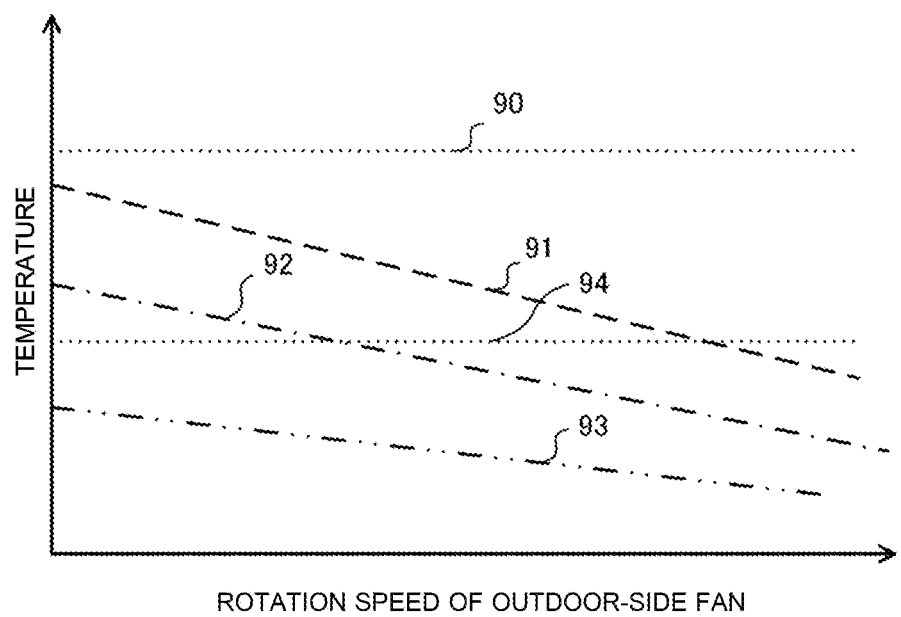
FIG. 10 is a graph illustrating a relationship between a temperature of each component and a rotation speed of an outdoor-side fan 7 in the outdoor unit 1 of the air-conditioning apparatus 100 according to Embodiment 1.

Furthermore, in Embodiment 1, regarding the first heat generating component and the second heat generating component, the data regarding the relationship between the change in the temperature of each component and the rotation speed of the outdoor-side fan 7 may be acquired in advance, for example, through an experiment. FIG. 10 is a graph indicating a relationship between the temperature of each component and the rotation speed of the outdoor-side fan 7 in the outdoor unit 1 of the air-conditioning apparatus 100 according to Embodiment 1. In FIG. 10, the horizontal axis represents the rotation speed of the outdoor-side fan 7; and the vertical axis represents temperatures of the reactor 41, the first IPM 36, and the main electrolytic capacitor 38. In FIG. 10, the dotted line 90 represents the abnormal temperature. The dashed line 91 represents the temperature of the reactor 41. The dashed-dotted line 92 represents the temperature of the first IPM 36 that is detected by the temperature detection circuit 37. The dashed-two dotted line 93 represents the temperature of the main electrolytic capacitor 38. The dotted line 94 represents the first threshold value. At a stage in which data as indicated in FIG. 10 is acquired, at each component, a temperature detection circuit is provided. Then, the coefficient $\alpha$ and the coefficient $\beta$ are determined depending on the data as indicated both in FIGS. 9 and 10. In this case, the coefficient $\alpha$ and the coefficient $\beta$ can be determined with higher accuracy.

FIG. 6 will be re-described. The estimate calculation module 72 further calculates an estimate of the life of the second heat generating component based on the temperature estimate T2 of the second heat generating component. An estimate L2 of the life of the second heat generating component is obtained, for example, by the following equation (2).

In the case where the second heat generating component is the main electrolytic capacitor 38, the following equation (2) is satisfied, where Lo is the lift at the time when a rated voltage is applied at an upper category temperature, To is the upper category temperature, and T2 is the temperature estimate, $$L2 = Lo \times 2^{((To-T2)/10)} \quad (2)$$

Where L1 is a product life of the second heat generating component, the product life L1 is set in advance, for example, to 15 or 20 years for each of kinds of second heat generating components, for example, based on product specifications. The product life L1 is a time period from the time at which the component starts to be used to the time at which a wear-out failure occurs therein. The product life L1 is determined for each of kinds of second heat generating components, for example, through a reliability test. The estimate calculation module 72 compares the estimate L2 of the life of the second heat generating component with the product life L1. When L2 is longer than or equal to L1, the estimate calculation module 72 causes the alarm module 73 to output a message suggesting replacement of the second heat generating component to a user. This message will be hereinafter referred to as a first alarm. That is, when the calculated estimate L2 of the life of the second heat generating component has already reached the product life L1, the second heat generating component should be promptly replaced by a new one, and the first alarm is thus output from the alarm module 73. For example, if the product life L1 is 15 years, and the estimate L2 is, for example, 16 years, the first alarm is output.

By contrast, when L2 is less than L1 and the difference between L2 and L1 is less than or equal to a second threshold value, the estimate calculation module 72 performs a second process to protect the second heat generating component from heat. Regarding the second threshold value, it suffices that the second threshold value is optionally set to, for example, approximately one to three years. That is, when the calculated estimate L2 of the life of the second heat generating component does not reach the product life L1 but is close to the product life L1, it is appropriate to make a notification indicating that the time for replacement of the second heat generating component is drawing near, and the second process is thus performed. On the other hand, when L2 is less than L1 and the difference between L2 and L1 exceeds the second threshold value, the time for replacement of the second heat generating component does not yet draw near, and thus the estimate calculation module 72 does nothing in particular. As the second process, for example, the following processes (a2) to (b2) are present.

(a2): A process of outputting, from the alarm module 73 to the user, a message indicating that the second heat generating component is damaged by heat. This message will be hereinafter referred to as a second alarm.

(b2): A process of switching an operation mode of the air-conditioning apparatus 100 to a life extension operation mode in which heat damage of the second heat generating component is reduced. In the life extension operation mode, for example, a driving frequency of the compressor 4 is set to a smaller value than that during normal operation, or a rotation speed of the outdoor-side fan 7 is set to a higher value than that during normal operation.

The following description is made with respect to the case where the above process (a2) is performed as the second process. For example, when the second heat generating component is used at a higher temperature than expected in advance, the second alarm is given beforehand. Thus, it is possible to prepare for service before a failure occurs in the second heat generating component. As a result, it is possible to efficiently offer service, and thus avoid a situation in which the service takes a lot of time. Because of accumulation of heat, the life of the main electrolytic capacitor 38 is shortened and the main electrolytic capacitor 38 can ignite. Therefore, in Embodiment 1, regarding the main electrolytic capacitor 38 as well, a rise in temperature is anticipated and the second alarm is given beforehand, whereby it is possible to avoid occurrence of an unexpected failure in the main electrolytic capacitor 38. It should be noted that both the process (a2) and the process (b2) may be performed as the second process.

As indicated by the above equation (2), the estimate L2 of the life of the second heat generating component is estimated from accumulated data on the temperature estimate T2 of the second heat generating component. When Artificial Intelligence (AI) is used in this estimation process, estimation can be made with a higher accuracy. Specifically, the estimate calculation module 72 detects clogging of the first heat sink 42 and the second heat sink 43, and anticipates occurrence of a failure in the second heat generating component on the basis of this detection by AI technology. In this case, when clogging occurs in the first heat sink 42 and the second heat sink 43, a cooling efficiency is reduced. Therefore, the cooling efficiency is estimated based on the level of clogging of the first heat sink 42 and the second heat sink 43 using the AI technology, and a failure of the second heat generating component is anticipated based on the estimated cooling efficiency and the accumulated data on the temperature estimate T2 of the second heat generating component. Alternatively, although an estimate of the life of the second heat generating component may be obtained by an arithmetic equation, such as the above equation (2), the estimate may be obtained from a data table. In this case, the storage module 74 stores, in advance, a data table in which a relationship between the temperature estimate T2 of the second heat generating component and the estimate of the life of the second heat generating component is determined. Then, the estimate calculation module 72 may obtain the estimate of the life of the second heat generating component, using the data table.

It is assumed that in Embodiment 1, components, such as the second IPMs 40, which have a large temperature margin are neither the first heat generating components nor the second heat generating components.

The alarm module 73 outputs an alarm to the user in response to a command from the estimate calculation module 72. The alarm is, for example, a message, light, or sound. The alarm module 73 is, for example, a liquid crystal display, a pilot lamp, or a buzzer.

Next, a hardware configuration of the control module 58 will be described. In the control module 58, functions of the temperature acquisition module 70, the temperature management module 71, and the estimate calculation module 72 are fulfilled by a processing circuit. The processing circuit is dedicated hardware or a processor. The dedicated hardware is, for example, an application specific integrated circuit (ASIC) or a field programmable gate array (FPGA). The processor executes a program stored in the storage module 74. The storage module 74 is a memory. The memory is a non-volatile or volatile semiconductor memory, such as a random access memory (RAM), a read only memory (ROM), a flash memory, or an erasable programmable ROM (EPROM), or a disk, such as a magnetic disk, a flexible disk, or an optical disk.

It should be noted that although in FIGS. 4 and 5, illustration of some components is omitted in order that the figures be simplified, the power conversion device 50 and the control module 58 as illustrated in FIG. 6 are included in the controller 3, as well as components for controlling components provided in the outdoor unit 1 as illustrated in FIG. 2.

Figure 7:
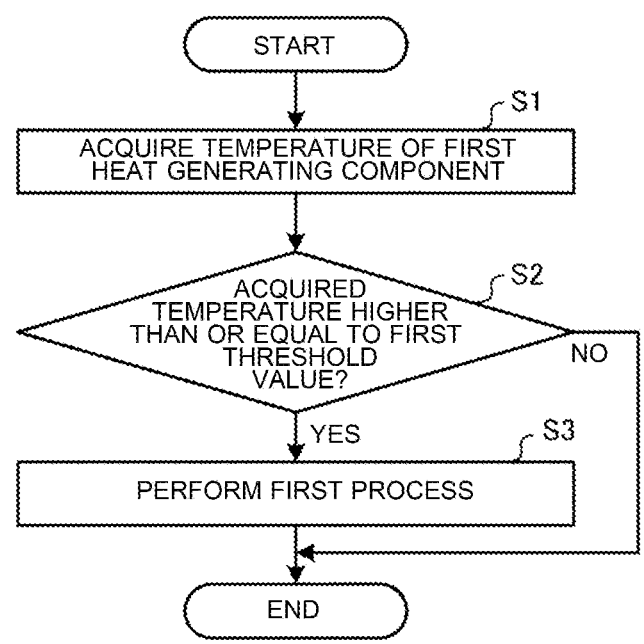
FIG. 7 is a flowchart illustrating the flow of a process by a control module 58 of the outdoor unit 1 of the air-conditioning apparatus 100 according to Embodiment 1.
Figure 8:
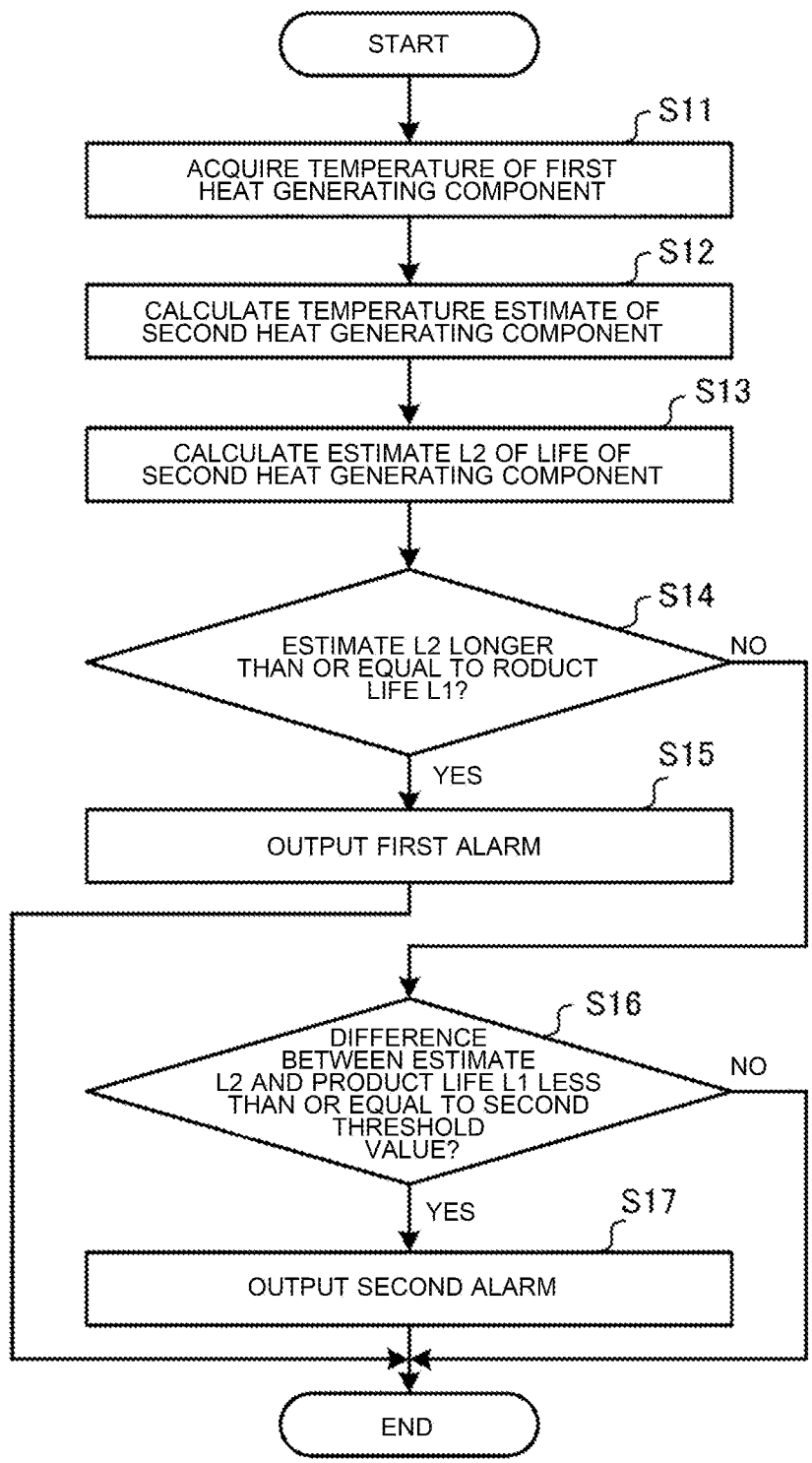
FIG. 8 is a flowchart illustrating the flow of a process by the control module 58 of the outdoor unit 1 of the air-conditioning apparatus 100 according to Embodiment 1.

Next, the operation of the control module 58 will be described. FIGS. 7 and 8 are respective flowcharts indicating the flows of processes by the control module 58 of the outdoor unit 1 of the air-conditioning apparatus 100 according to Embodiment 1. FIG. 7 illustrates the flow of a process that is performed on the first heat generating component by the control module 58, and FIG. 8 illustrates the flow of a process that is performed on the second heat generating component by the control module 58.

First, FIG. 7 will be described. As illustrated in FIG. 7, in step S1, the temperature acquisition module 70 acquires a temperature of the first heat generating component that is detected by the temperature detection circuit 37. Specifically, the temperature acquisition module 70 acquires a temperature of the first IPM 36.

Next, in step S2, the temperature management module 71 determines whether or not the temperature acquired in step S1 is higher than or equal to the first threshold value determined in advance. When the temperature is higher than or equal to the first threshold value, the processing by the temperature management module 71 proceeds to step S3. When the temperature is less than the first threshold value, the temperature management module 71 ends the processing of the flow indicated in FIG. 7 without doing anything.

In step S3, the temperature management module 71 performs the above first process to reduce the temperature of the first heat generating component and protect the first heat generating component.

Next, FIG. 8 will be described. As indicated in FIG. 8, in step S11, the temperature acquisition module 70 acquires a temperature of the first heat generating component that is detected by the temperature detection circuit 37. Specifically, the temperature acquisition module 70 acquires a temperature of the first IPM 36.

Next, in step S12, the estimate calculation module 72 calculates a temperature estimate T2 of the second heat generating component based on the temperature of the first heat generating component acquired in step S11.

Next, in step S13, the estimate calculation module 72 calculates an estimate L2 of the life of the second heat generating component based on the temperature estimate T2 of the second heat generating component.

Next, in step S14, the estimate calculation module 72 compares the estimate L2 of the life of the second heat generating component with the product life L1 and determines whether or not L2 is longer than or equal to L1. When L2 is longer than or equal to L1, the processing by the estimate calculation module 72 proceeds to step S15. When L2 is less than L1, the processing by the estimate calculation module 72 proceeds to step S16.

In step S15, the estimate calculation module 72 transmits, to the alarm module 73, a command signal that instructs the alarm module 73 to output the first alarm suggesting replacement of the second heat generating component to the user. Thus, the alarm module 73 outputs the first alarm.

In step S16, it is determined whether the difference between L1 and L2 is less than or equal to the second threshold value. When the difference between L1 and L2 is less than or equal to the second threshold value, the processing proceeds to step S17. When the difference between L1 and L2 is greater than the second threshold value, the processing indicated in FIG. 8 is ended.

In step S17, the estimate calculation module 72 transmits to the alarm module 37, a command signal that gives an instruction to output the second alarm indicating that the second heat generating component is damaged to the user. Thus, the alarm module 73 outputs the second alarm. It should be noted that the process of step S17 is not limited to the above process, and any of the above second processes may be performed.

As described above, in Embodiment 1, the temperature detection circuit 37 is provided for the first heat generating component to detect the temperature of the first heat generating component. When the temperature of the first heat generating component is higher than or equal to the first threshold value, the temperature management module 71 performs the first process to reduce the temperature of the first heat generating component. Therefore, it is possible to prevent the temperature of the first heat generating component from exceeding the abnormal temperature, and thus prevent the first heat generating component from being broken by the abnormal temperature.

Furthermore, in Embodiment 1, the temperature detection circuit 37 is provided only in a first component of first heat generating components. In Embodiment 1, the first component is the first IPM 36. Another component of the first heat generating components will be referred to as a second component. In Embodiment 1, the second component is the reactor 41. The temperature of the second component tends to rise in the same manner as the temperature of the first component in which the temperature detection circuit 37 is provided. Therefore, because of execution of the first process based on the temperature of the first component, the second component can be prevented from being broken by the abnormal temperature. In Embodiment 1, the first component in which the temperature detection circuit 37 can be easily provided is the first IPM 36, and the second component is the reactor 41. Thus, since the temperature detection circuit 37 is provided only in the first component, the number of temperature detection circuits can be reduced. Accordingly, the cost of the outdoor unit 1 can be reduced.

When the temperature of the reactor 41 reaches a high temperature, lives of other components in the controller 3, such as the main electrolytic capacitor 38, are affected. Thus, the control module 58 performs the first process based on the temperature of the first IPM 36, thereby performing a control to reduce an excessive rise in the temperature of the reactor 41. That is, in the case where the outdoor unit 1 is driven under a high load when the temperature of outside air is high, the temperature of the reactor 41 exceeds the first threshold value, and the control module 58 thus performs the first process, for example, to reduce the driving frequency of the compressor 4. It is therefore possible to prevent the temperature of the reactor 41 from exceeding the abnormal temperature, and also extend the life of the main electrolytic capacitor 38.

The main electrolytic capacitor 38 and the reactor 41 are important protection components to be protected from high temperatures. In Embodiment 1, as illustrated in FIGS. 4 and 5, the main electrolytic capacitors 38 and the reactor 41 are disposed in close to the temperature detection circuit 37. Therefore, the ambient temperature of the main electrolytic capacitors 38 is considered to be the same as that of the reactor 41, and the high-temperature protection process can be performed.

In Embodiment 1, a temperature estimate of the second heat generating component is obtained from the temperature of the first heat generating component. A condition for achieving such a process is that both the first heat generating component and the second heat generating component can benefit from cooling air sent by the outdoor-side fan 7. Specifically, it is preferable that at least one of the following three conditions be satisfied.

(Condition 1): Both the first heat generating component and the second heat generating component are disposed in an air passage for cooling air from the outdoor-side fan 7.

(Condition 2): Both the first heat generating component and the second heat generating component are disposed in the same space (that is, in the housing 3a).

(Condition 3): The distance between the first heat generating component and the second heat generating component is less than or equal to a third threshold value determined in advance.

In Embodiment 1, since conditions 1 to 3 are satisfied, a process of obtaining the temperature estimate of the second heat generating component from the temperature of the first heat generating component can be performed. Furthermore, in Embodiment 1, the life of the second heat generating component is estimated from the temperature estimate of the second heat generating component, and it is therefore possible to avoid a situation in which a failure unexpectedly occurs in the second heat generating component, thereby improving the reliability of the outdoor unit 1 of the air-conditioning apparatus 100.

As described above, in Embodiment 1, it is possible to reduce excessive rises in temperatures of the first heat generating component and the second heat generating component, and ensure the reliability of the outdoor unit 1. Furthermore, it is not necessary to provide a plurality of temperature detection circuits 37, and is therefore possible to reduce the cost and size of the outdoor unit 1. Furthermore, as the number of temperature detection circuits 37 is reduced, the number of lines for use in transmission of data indicating a temperature, from the temperature detection circuit 37 to the control module 58, can also be reduced, whereby design work for drawing of lines is not necessary. In addition, since the number of lines is reduced, provision of each of the components is not restricted, and each component is thus more flexibility provided.

Embodiment 2

Figure 11:
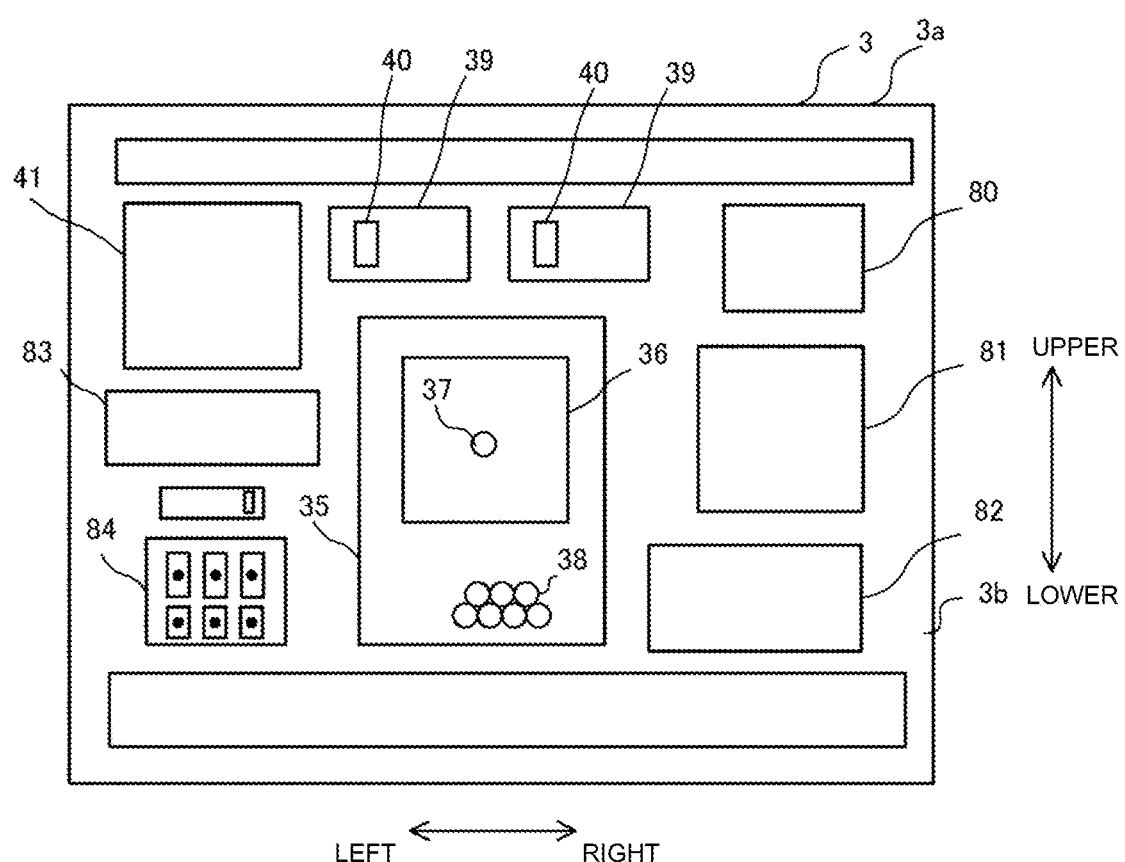
FIG. 11 is a front view illustrating a configuration of the controller 3 provided in the air-conditioning apparatus 100 according to Embodiment 2.
Figure 12:
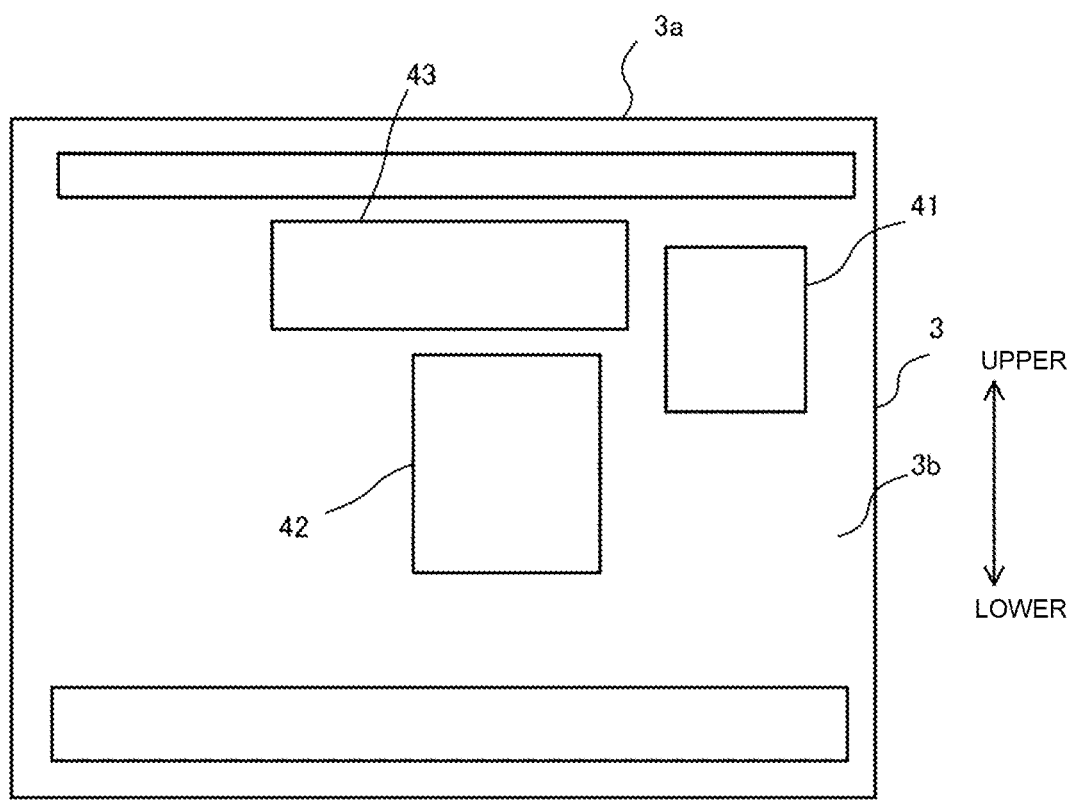
FIG. 12 is a rear view illustrating the configuration of the controller 3 provided in the air-conditioning apparatus 100 according to Embodiment 2.

FIG. 11 is a front view illustrating a configuration of the controller 3 provided in the air-conditioning apparatus 100 according to Embodiment 2. FIG. 12 is a rear view illustrating the configuration of the controller 3 provided in the air-conditioning apparatus 100 according to Embodiment 2. In FIGS. 11 and 12, components that are the same as those in FIGS. 4 and 5 are denoted by the same reference signs, and their descriptions will thus be omitted.

The configuration and operation of the air-conditioning apparatus 100 according to Embodiment 2 are basically the same as those in Embodiment 1. Thus, regarding Embodiment 2, a configuration of the controller 3 will be described, and regarding all other configurations and operations, related descriptions made regarding Embodiment 1 will be referred to.

As illustrated in FIG. 11, the controller 3 further includes, in addition to the configuration as illustrated in FIG. 4, a power supply board 80, a control board 81, a communication board 82, a noise filter 83, and a terminal block 84.

As illustrated in FIG. 11, the noise filter 83 and the terminal block 84 are located on the left side of the first inverter board 35. The noise filter 83 is located above the terminal block 84, and the reactor 41 is located above the noise filter 83.

As illustrated in FIG. 11, the power supply board 80 is located on the right side of the second inverter boards 39. The control board 81 and the communication board 82 are located on the right side of the first inverter board 35. The power supply board 80 is located above the control board 81. The control board 81 is located above the communication board 82.

In the outdoor unit 1, air flows from a lower side to an upper side as illustrated in FIG. 3. Thus, in FIG. 11, the upper side is the leeward side, and the lower side is the windward side. Therefore, a component that generates a small amount of heat is provided on the leeward side, and a component that generates a large amount of heat is provided on the windward side. As a result, it is possible to efficiently cool each component.

It should be noted that the locations of components as illustrated in FIG. 12 are basically the same as those as illustrated in FIG. 5, and their descriptions will thus be omitted.

As described above, Embodiment 2 is similar to Embodiment 1 in configuration and operation. Therefore, in Embodiment 2, it is possible to obtain the same advantages as described above regarding Embodiment 1.

The invention claimed is:

1. An outdoor unit of an air-conditioning apparatus, comprising:
    a refrigerant circuit in which a compressor and an outdoor-side heat exchanger are connected by a refrigerant pipe;
    an outdoor-side fan configured to send air to the outdoor-side heat exchanger;
    a controller including an inverter circuit configured to drive the compressor; and
    at least one of a display, a pilot lamp, and a buzzer configured to output an alarm, wherein the controller includes
- a compressor-driving IPM (intelligent power module) and a reactor,
- a capacitor that generates a smaller amount of heat than the compressor-driving IPM and the reactor,
- a temperature detection circuit provided in the compressor-driving IPM and configured to detect a temperature of the compressor-driving IPM, wherein the controller is configured to
- acquire the temperature of the compressor-driving IPM that is detected by the temperature detection circuit,
- calculate a temperature estimate of the capacitor based on the temperature acquired by the controller,
- calculate an estimate of a life of the capacitor based on the temperature estimate,
- output a command instructing the at least one of a display, a pilot lamp, and a buzzer to output a first alarm suggesting replacement of the capacitor, when the estimate of the life of the capacitor is longer than or equal to a product life of the capacitor, and
- perform a capacitor protection process to protect the capacitor, when the estimate of the life of the capacitor is less than the product life of the capacitor and a difference between the estimate of the life and the product life is less than or equal to a product life threshold value.

2. The outdoor unit of the air-conditioning apparatus of claim 1, wherein the controller is further configured to perform a compressor-driving IPM and reactor protection process to protect the compressor-driving IPM and the reactor, when the temperature acquired by the controller is higher than or equal to a temperature threshold value.

3. The outdoor unit of the air-conditioning apparatus of claim 2, wherein the compressor-driving IPM and reactor protection process is at least one of a process of decreasing a driving frequency of the compressor and a process of increasing a rotation speed of the outdoor-side fan.

4. The outdoor unit of the air-conditioning apparatus of claim 1,
wherein the capacitor protection process is at least one of a process of outputting a command instructing the at least one of a display, a pilot lamp, and a buzzer to output a second alarm indicating that the capacitor is damaged by heat, a process of decreasing a driving frequency of the compressor, and a process of increasing a rotation speed of the outdoor-side fan.

5. The outdoor unit of the air-conditioning apparatus of claim 1,
wherein
the compressor-driving IPM includes the inverter circuit configured to drive the compressor.

6. The outdoor unit of the air-conditioning apparatus of claim 1,
wherein the capacitor is an electrolytic capacitor.

7. The outdoor unit of the air-conditioning apparatus of claim 1,
wherein
the controller includes a housing provided in an air passage formed by driving the outdoor-side fan, and
the compressor-driving IPM, the reactor, and the capacitor are provided in the housing.

8. The outdoor unit of the air-conditioning apparatus of claim 1,
wherein
the controller includes a fan-driving IPM including an inverter circuit configured to drive the outdoor-side fan, and
in an air passage formed by driving the outdoor-side fan, the fan-driving IPM is located leeward of the compressor-driving IPM.

* * * * *